United States Patent [19]
Lee et al.

[11] Patent Number: 5,278,677
[45] Date of Patent: Jan. 11, 1994

[54] DEVICE FOR REMOVING DOCUMENT JAMMING GENERATED AT A TRANSMITTER OF A FACSIMILE USING A CONTACT IMAGE SENSOR

[75] Inventors: Jae Y. Lee, Seocho-ku; Jae S. Kim, Guro-ku; Sung H. Lee, Jungryang-ku, all of Rep. of Korea

[73] Assignee: Sindo Ricoh Co., Ltd., Seoul, Rep. of Korea

[21] Appl. No.: 795,730

[22] Filed: Nov. 21, 1991

[30] Foreign Application Priority Data

Dec. 28, 1990 [KR] Rep. of Korea ............... 1990-22146

[51] Int. Cl.$^5$ ............................................. H04N 1/04
[52] U.S. Cl. ................................... 358/498; 358/482; 358/488; 358/496
[58] Field of Search ............... 358/482, 488, 496, 498

[56] References Cited

U.S. PATENT DOCUMENTS

| | | | |
|---|---|---|---|
| 4,729,036 | 3/1988 | Ikeda et al. | 358/498 |
| 4,768,100 | 8/1988 | Kunishima et al. | 358/498 |
| 5,077,618 | 12/1991 | Sakai et al. | 358/498 |

Primary Examiner—Edward L. Coles, Sr.
Assistant Examiner—Kimberly A. Williams
Attorney, Agent, or Firm—Darby & Darby

[57] ABSTRACT

A device for removing document jamming generated at a platen roller and a contact image sensor of a facsimile comprising sensor brackets mounted to opposite ends of the contact image sensor and pivotally mounted to both sides of a main frame of the body of the facsimile, so as to pivotally move the contact image sensor, each of the sensor brackets having an operating portion, and cam members each having a cam surface being in contact with the operating portion of the corresponding sensor bracket. Each cam member pivotally moves the contact image sensor between its operation position where it is in contact with the platen roller and its document jamming removal position where it is separated from the platen roller to form a gap therebetween. An actuating lever is connected to the cam members for moving it between a first position corresponding to the operation position of the cam members and a second position corresponding to the document jamming removal position. In the device, a certain gap can be formed between the platen roller and the contact image sensor, only by the manipulation of the actuating lever disposed outside of the facsimile body.

4 Claims, 3 Drawing Sheets

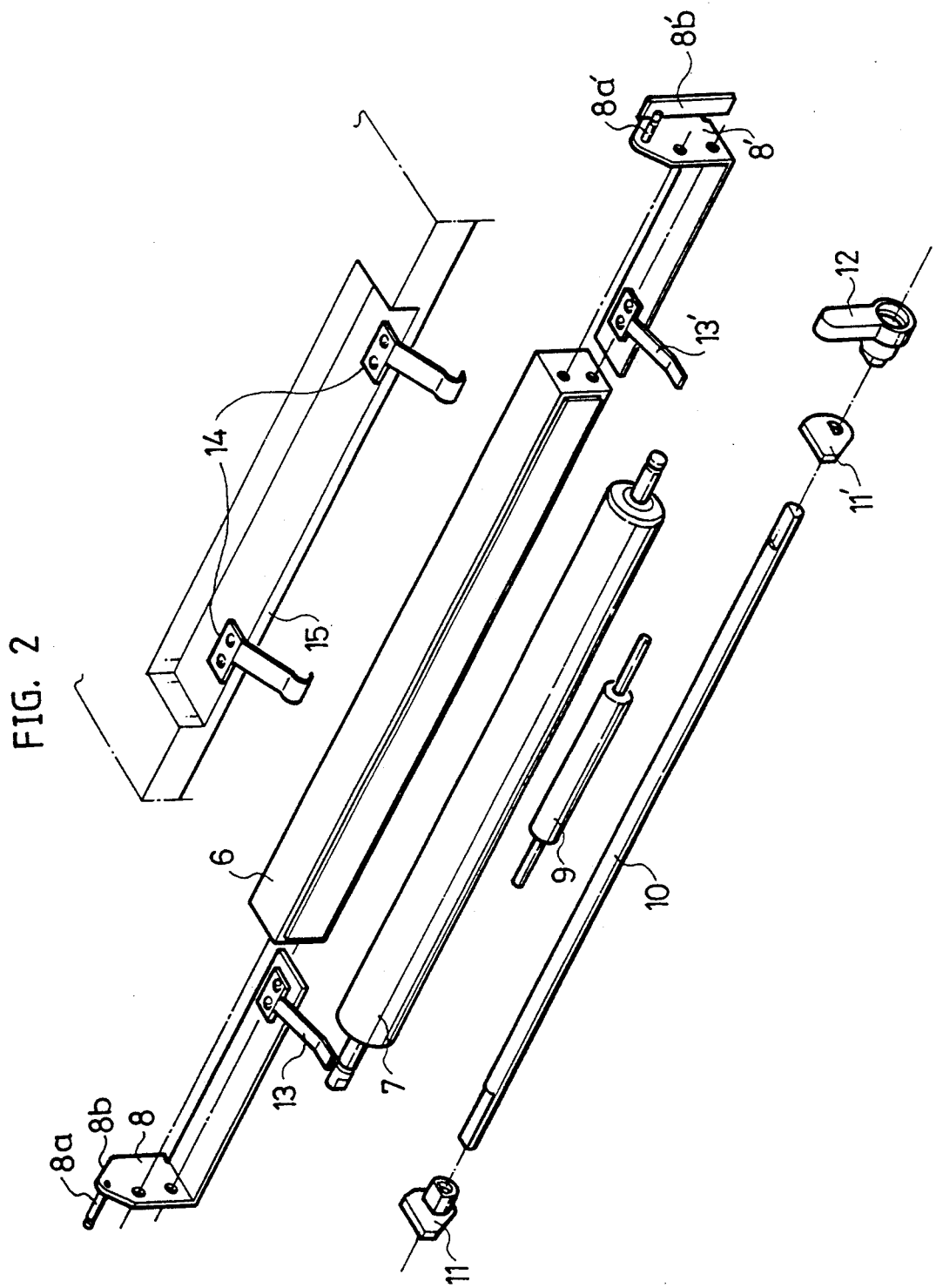

DEVICE FOR REMOVING DOCUMENT JAMMING GENERATED AT A TRANSMITTER OF A FACSIMILE USING A CONTACT IMAGE SENSOR

BACKGROUND OF THE INVENTION

1. Field of the Invention

The present invention relates to a device for removing document jamming generated at a transmitter of a facsimile using a contact image sensor.

2. Description of the Prior Art

As shown in FIG. 1A, a generally used facsimile of the type using a contact image sensor (CIS) comprises a contact image sensor 1 disposed in a written document feeding path, as a transmitter and a thermal print head 2 disposed in a paper feeding path, as a receiver. The contact image sensor 1 and the thermal print head 2 are fixedly mounted to a top cover 5 pivotally mounted to the body of the facsimile and closely in contact with platen rollers 3 and 3' rotatably mounted to a main frame 4 of the facsimile body, respectively. In case that a document has been jammed at the transmitter, the cover 5 is lifted to separate the image sensor 1 from the platen roller 3, as shown in FIG. 1B, so that the pressure maintained between the image sensor 1 and the platen roller 3 is released, thereby enabling the document jamming to be removed. However, this jamming removal operation unnecessarily or undesirably results in release of the pressure at the receiver, that is the pressure maintained between the thermal print head 2 and the platen roller 3'. It is required that the contact image sensor 1 and the thermal print head 2 be closely in contact with platen rollers 3 and 3' under controlled pressure, respectively. Due to the opening of the cover plate 5, however, precise pressure control can not be accomplished.

SUMMARY OF THE INVENTION

Therefore, it is an object of the invention to eliminate the above-mentioned disadvantage encountered in the prior art and to provide a device for removing document jamming generated at a transmitter of a facsimile, capable of improving the control of pressure acting on the contact image sensor, stably maintaining the contact image sensor at its jamming removing state, and thereby enabling the jamming of document to be surely and easily removed.

Another object of the invention is to provide a device for removing document jamming generated at a transmitter of a facsimile, capable of enabling the jamming of document to be surely and easily removed, even in the case of using a pinch roller.

In accordance with the present invention, these objects can be accomplished by providing a device for removing document jamming generated at a transmitter of a facsimile which comprises a platen roller and a contact image sensor being in contact with said platen roller, said device comprising: a pair of sensor brackets fixedly mounted to opposite ends of said contact image sensor and pivotally mounted to both sides of a main frame of the body of said facsimile, so as to pivotally move the contact image sensor, each of said sensor brackets having a pivot pin protruded outwardly and an operating portion; at least one plate spring fixedly mounted to said main frame and adapted to urge the contact image sensor against the platen roller under a proper pressure; operating means operatively connected to respective operating portions of the sensor brackets for pivotally moving the contact image sensor between its operation position where it is in contact with the platen roller and its document jamming removal position where it is separated from the platen roller to form a gap therebetween; and an actuating lever operatively connected to said operating means at outside of the facsimile body for moving it between a first position corresponding to said operation position of the operating means and a second position corresponding to the document jamming removal position of the operating means.

In the case where the facsimile further comprises a pinch roller adapted to be in contact with the platen roller for assisting in feeding a document, the device further comprises a pair of plate springs fixedly mounted to the sensor brackets, respectively, and adapted to urge said pinch roller against the platen roller at the operation position of the contact image sensor and release their spring force acting on the pinch roller at the document jamming removal position of the contact image sensor so that a gap is formed between the platen roller and the pinch roller.

BRIEF DESCRIPTION OF THE DRAWINGS

Other objects and aspects of the invention will become apparent from the following description of embodiments with reference to the accompanying drawings in which:

FIG. 1A and 1B are schematic sectional views of a conventional device for removing document jamming in a generally used facsimile of the type using a contact image sensor, wherein FIG. 1A shows the facsimile in a normal operation state, while FIG. 1B shows the facsimile under the condition that a cover is opened;

FIG. 2 is an exploded perspective view of a device for removing document jamming in accordance with the present invention;

FIGS. 3A and 3B are schematic sectional views of the device shown in FIG. 2, wherein FIG. 3A shows the condition of the device at a normal operation state of the facsimile, while FIG. 3B shows the document jamming removal state of the device.

DETAILED DESCRIPTION OF THE PREFERRED EMBODIMENTS

Referring to FIG. 2, there is shown a device for removing document jamming generated at a transmitter of a facsimile, in accordance with the present invention.

Figure 1A:
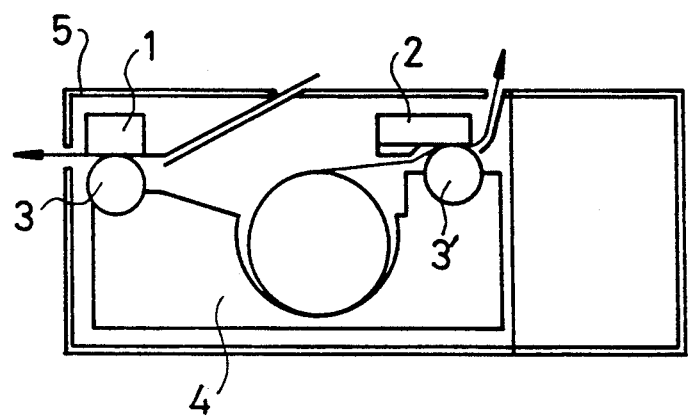
Figure 1B:
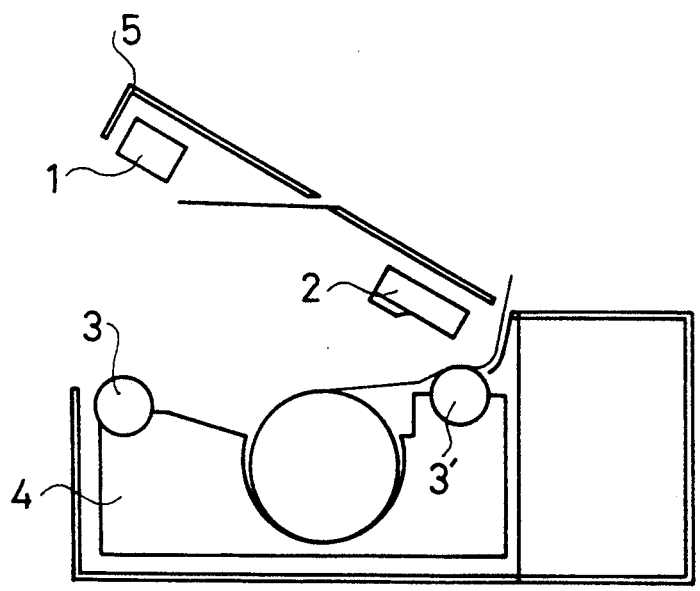
Figure 3A:
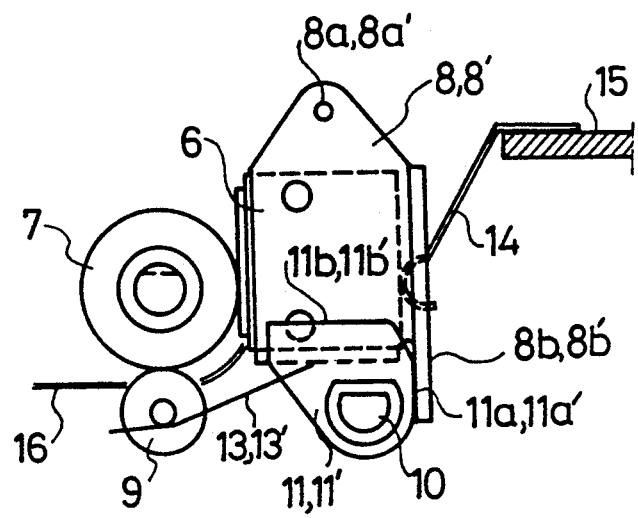
Figure 3B:
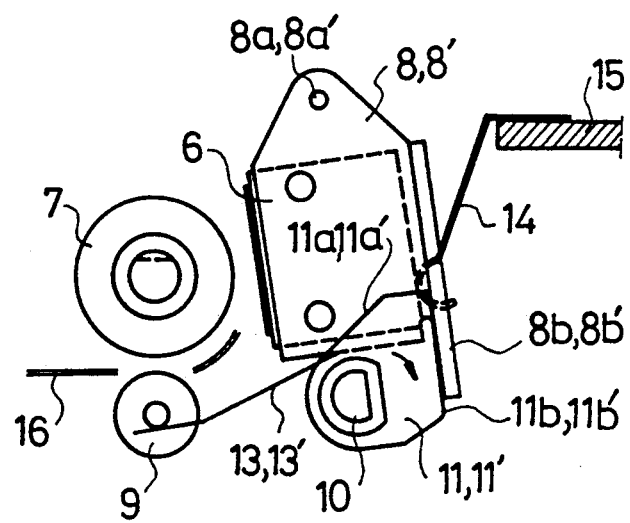

As shown in the FIGS. 2, 3a and 3b, the facsimile to which the present invention is applied comprises a contact image sensor 6 and a platen roller 7, as the transmitter for transmitting the content of a written document. In accordance with the present invention, the contact image sensor 6 is pivotally mounted to a portion of a main frame (not shown), by means of a pair of brackets 8 and 8' fixed to opposite ends of the contact image sensor 6, respectively. In the drawings, the main frame is only partially shown. That is, its upper main frame portion 15 and lower main frame portion 16 functioning as a document guide are only shown. Each sensor bracket 8 (or 8') is fixedly mounted to the corresponding end of the contact image sensor 6, by using screws or other well-known means and provided with a pivot pin 8a (or 8a') and an operating portion 8b (or 8b'). With this construction, the contact image sensor 6 can pivot about the pivot pins 8a and 8a'.

In order to maintain the contact image sensor 6 to be in contact with the platen roller 7 under a proper pressure, a pair of plate springs 14 are mounted to the upper main frame portion 15 and adapted to urge the contact image sensor 6 against the platen roller 7.

In accordance with the present invention, a shaft 10 is rotatably mounted to a main frame portion not shown and provided with opposite ends protruded outwardly beyond both sides of the main frame portion. To opposite protruded ends of the shaft 10, a pair of cam members 11 and 11' are fixedly mounted, respectively. Each cam member 11 (or 11') has a cam surface being in contact with the operating portion 8b (8b') of the corresponding sensor bracket 8 (or 8'). Each cam surface comprises a first flat cam surface portion 11a (or 11'a) and a second flat cam surface portion 11b (or 11'b). The distance of each second flat cam surface portion 11b (or 11'b) from the rotation center of the corresponding cam member 11 (11') is longer than that of the corresponding first flat cam surface portion 11a (11'a). When respective first flat cam surface portions 11a and 11'a of the cams 11 and 11' are in contact with respective corresponding operating portions 8b and 8b', the contact image sensor 6 is maintained to be in contact with the platen roller 7, by virtue of the spring force of the plate springs 14. However, when respective second flat cam surface portions 11b and 11'b of the cams 11 and 11' are in contact with respective corresponding operating portions 8b and 8b', the contact image sensor 6 is separated from the platen roller 7, so as to release the pressure acting thereon and form a gap therebetween, since the second flat cam surface portions 11b and 11'b push the operating portions 8b and 8b' against the spring force of the plate springs 14.

Outside of the facsimile body, an actuating lever 12 is fixedly mounted to one of protruded ends of the shaft 10, to rotate the cam members 11 and 11' between one position where their first flat cam surface portions 11a and 11'a are in contact with respective corresponding operating portions 8b and 8b' and the other position where their second flat cam surface portions 11b and 11'b of the cams 11 and 11' are in contact with respective corresponding operating portions 8b and 8b'.

The facsimile may comprises a pinch roller 9 rotatably mounted to the main frame portion, to which the platen roller 7 is mounted, to be in contact with the platen roller 7, under a proper pressure. In this case, a pair of plate springs 13 and 13' are provided which is fixedly mounted to the sensor brackets 8 and 8' by means of, for example, a spotting, respectively, and adapted to urge the pinch roller 9 against the platen roller 7. As the contact image sensor 6 pivotally moves to be separated from the platen roller 7, according to the cam operation of cam members 11 and 11', the plate springs 13 and 13' are also moved to release their spring force acting on the pinch roller 9, thereby causing the pressure maintained between the platen roller 7 and the pinch roller 9 to be released.

The operation of the device according to the present invention will now be described in detail, in conjunction with FIGS. 3A and 3B.

The facsimile which includes the device of the present invention operates under the condition shown in FIG. 3A. In normal state of FIG. 3A, the cam members 11 and 11' is maintained at their first position where respective first cam surface portions thereof are in contact with respective corresponding operating portions 8b and 8b' of the sensor brackets 8 and 8'. Accordingly, the contact image sensor 6 is in contact with the platen roller 7, by virtue of the spring force of the plate springs 14. The pinch roller 9 is also in contact with the platen roller 7, by virtue of the plate springs 13 and 13'.

In the case that jamming of a document is generated at the transmitter of facsimile during the operation, the operator rotates the lever 12 so that the cam members 11 and 11' pivotally moves from their first position to their second position where respective second cam surface portions 11b and 11'b are in contact with respective corresponding operating portions 8b and 8b' of the sensor brackets 8 and 8', as shown in FIG. 3B. At this time, the operating portions 8b and 8b' of sensor brackets 8 and 8' are pushed back against the spring force of the plate springs 14, since the distance of each second flat cam surface portion 11b (or 11'b) from the rotation center of the corresponding cam member 11 (or 11') is longer than that of the corresponding first flat cam surface portion 11a (or 11'a). As a result, the contact image sensor 6 simultaneously pivots to be separated from the platen roller 7, thereby forming a gap therebetween. According to the pivotal movement of the contact image sensor 6, the plate springs 13 and 13' are also simultaneously moved to release their spring force acting on the pinch roller 9, thereby forming a gap between the platen roller 7 and the pinch roller 9. By virtue of the gap formed between the contact image sensor 6 and the platen roller 7 and the gap formed between the platen roller 7 and the pinch roller 9, the jammed document can be easily removed.

After the removal of jamming, as the actuating lever 12 is reversely rotated, all parts return to their original positions shown in FIG. 3A, so that proper pressure is maintained again among the contact image sensor 6, the platen roller 7 and the pinch roller 9.

Since the cam surface portions 11a, 11'a, 11b and 11'b of the cam members 11 and 11' are flat, the contact image sensor 6 is stably maintained at its operation position or its jamming removing position, without any movement.

As apparent from the above description, the present invention provides a device for removing document jamming, capable of improving the control of pressure acting on the contact image sensor. In the device of the present invention, a certain gap can be formed between the platen roller and the contact image sensor, only by the manipulation of the actuating lever disposed outside of the facsimile body. Furthermore, the contact image sensor can be stably maintained at its jamming removing state, by virtue of the cams having flat cam surface portions being stably in contact with the operating portions of sensor brackets. Even in the case of using a pinch roller, its pressure acting on the platen roller can be easily released at the same time, thereby enabling the jamming of document to be surely and easily removed.

Although the preferred embodiments of the invention have been disclosed for illustrative purpose, those skilled in the art will appreciated that various modifications, additions and substitutions are possible, without departing from the scope and spirit of the invention as disclosed in the accompanying claims.

What is claimed is:

1. A device for removing document jamming generated at a transmitter of a facsimile which comprises a platen roller and a contact image sensor being in contact with said platen roller, said device comprising:

a pair of sensor brackets fixedly mounted to opposite ends of said contact image sensor and pivotally mounted to both sides of a main frame of the body of said facsimile, so as to pivotally move the contact image sensor, each of said sensor brackets having a pivot pin protruded outwardly and an operating portion;

at least one plate spring fixedly mounted to said main frame and adapted to urge the contact image sensor against the platen roller under a proper pressure;

operating means operatively connected to respective operating portions of the sensor brackets for pivotally moving the contact image sensor between its operation position where it is in contact with the platen roller and its document jamming removal position where it is separated from the platen roller to form a gap therebetween;

an actuating lever operatively connected to said operating means at outside of the facsimile body for moving it between a first position corresponding to said operation position of the operating means and a second position corresponding to the document jamming removal position; and said operating means comprises a shaft rotatably mounted to the main frame and provided with opposite ends protruded outwardly beyond both sides of the main frame, one of said protruded ends being connected with said actuating lever, and a pair of cam members fixedly mounted to said opposite protruded ends of the shaft, respectively, each of said cam member having a cam surface being in contact with the operating portion of the corresponding sensor bracket.

2. A device in accordance with claim 1, in the case where said facsimile further comprises a pinch roller adapted to be in contact with said platen roller for assisting in feeding a document, further comprising a pair of plate springs fixedly mounted to the sensor brackets, respectively, and adapted to urge said pinch roller against the platen roller at the operation position of said contact image sensor and release their spring force acting on the pinch roller at the document jamming removal position of the contact image sensor so that a gap is formed between the platen roller and the pinch roller.

3. A device for removing document jamming generated at a transmitter of a facsimile which comprises a platen roller and a contact image sensor being in contact with said platen roller, said device comprising:

a pair of sensor brackets fixedly mounted to opposite ends of said contact image sensor and pivotally mounted to both sides of a main frame of the body of said facsimile, so as to pivotally move the contact image sensor, each of said sensor brackets having a pivot pin protruded outwardly and an operating portion;

at least one plate spring fixedly mounted to said main frame and adapted to urge the contact image sensor against the platen roller under a proper pressure;

operating means operatively connected to respective operating portions of the sensor brackets for pivotally moving the contact image sensor between its operation position where it is in contact with the platen roller and its document jamming removal position where it is separated from the platen roller to form a gap therebetween;

an actuating lever operatively connected to said operating means at outside of the facsimile body for moving it between a first position corresponding to said operation position of the operating means and a second position corresponding to the document jamming removal position;

said operating means comprises a shaft rotatably mounted to the main frame and provided with opposite ends protruded outwardly beyond both sides of the main frame, one of said protruded ends being connected with said actuating lever, and a pair of cam members fixedly mounted to said opposite protruded ends of the shaft, respectively, each of said cam member having a cam surface being in contact with the operating portion of the corresponding sensor bracket; and said cam surface of each cam member comprises a first flat cam surface portion corresponding to the first position of said cam member and a second flat cam surface portion corresponding to the second position of the cam member, the distance of said second flat cam surface portion from the rotation center of the cam member being longer than that of said first flat cam surface portion so that the contact image sensor is stably maintained at its jamming removing position forming a gap, against the spring force of said plate spring.

4. A device for removing document jamming generated at a transmitter of a facsimile which comprises a platen roller and a contact image sensor being in contact with said platen roller, said device comprising:

a pair of sensor brackets fixedly mounted to opposite ends of said contact image sensor and pivotally mounted to both sides of a main frame of the body of said facsimile, so as to pivotally move the contact image sensor, each of said sensor brackets having a pivot pin protruded outwardly and an operating portion;

at least one plate spring fixedly mounted to said main frame and adapted to urge the contact image sensor against the platen roller under a proper pressure;

operating means operatively connected to respective operating portions of the sensor brackets for pivotally moving the contact image sensor between its operation position where it is in contact with the platen roller and its document jamming removal position where it is separated from the platen roller to form a gap therebetween;

an actuating lever operatively connected to said operating means at outside of the facsimile body for moving it between a first position corresponding to said operation position of the operating means and a second position corresponding to the document jamming removal position;

said operating means comprises a shaft rotatably mounted to the main frame and provided with opposite ends protruded outwardly beyond both sides of the main frame, one of said protruded ends being connected with said actuating lever, and a pair of cam members fixedly mounted to said opposite protruded ends of the shaft, respectively, each of said cam member having a cam surface being in contact with the operating portion of the corresponding sensor bracket; and a pinch roller adapted to be in contact with said platen roller for assisting in feeding a document, further comprising a pair of plate springs fixedly mounted to the sensor brackets, respectively, and adapted to urge said pinch roller against the platen roller at the operation position of said contact image sensor and release their spring force acting on the pinch roller at the document jamming removal position of the contact image sensor so that a gap is formed between the platen roller and the pinch roller said operating means comprises a shaft rotatably mounted to the main frame and provided with opposite ends protruded outwardly beyond both sides of the main frame, one of said protruded ends being connected with said actuating lever, and a pair of cam members fixedly mounted to said opposite protruded ends of the shaft, respectively, each of said cam member having a cam surface being in contact with the operating portion of the corresponding sensor bracket; and said cam surface of each cam member comprises a first flat cam surface portion corresponding to the first position of said cam member and a second flat cam surface portion corresponding to the second position of the cam member, the distance of said second flat cam surface portion form the rotation center of the cam member being longer than that of said first flat cam surface portion so that the contact image sensor is stably maintained at its jamming removing position forming a gap, against the spring force of said plate spring.

* * * * *